Nov. 14, 1933.  A. R. KEMP ET AL  1,935,323
UNDERGROUND CABLE
Filed Jan. 7, 1932
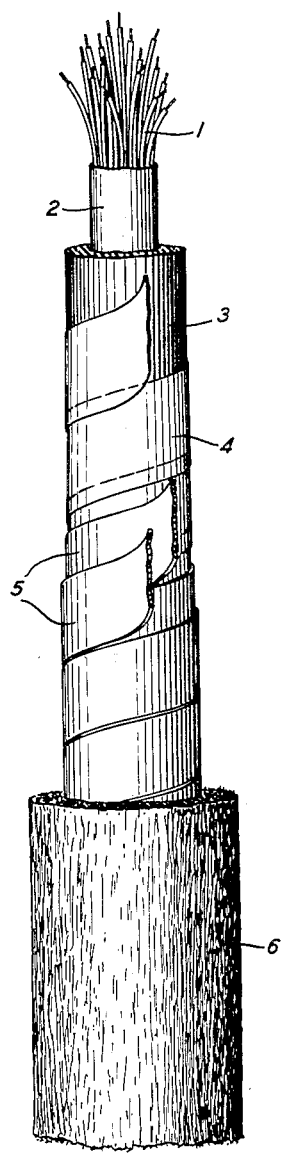
INVENTORS: A. R. KEMP
J. H. INGMANSON
BY J. W. Schmied
ATTORNEY Patented Nov. 14, 1933

1,935,323

UNITED STATES PATENT OFFICE 1,935,323

UNDERGROUND CABLE

Archie R. Kemp, Westwood, and John H. Ingmanson, Glen Ridge, N. J., assignors to Bell Telephone Laboratories, Incorporated, New York, N. Y., a corporation of New York Application January 7, 1932. Serial No. 585,224

1 Claim. (Cl. 173—266)

This invention relates to electric cables and more particularly to underground cables which for mechanical reasons require an external protective jacket.

An object of this invention is to provide an extrudable protective covering for underground cables which is tough and somewhat abrasive resistant, moisture-proof, flexible, corrosive resistant under ordinary soil conditions, and an efficient heat and electrical insulator.

A further object is to provide a cheap and readily available composition of material which is easily applied as one of the layers of a protective jacket for the metallic sheaths of underground cables.

A feature of this invention lies in the efficient and convenient manner in which the protective compound is applied to the sheaths of cables.

Lead-covered underground telephone cables are either drawn as cables into fibre ducts or into concrete or clay conduits, or are embedded directly into the ground. In such cables the lack of a suitable protective jacket has been found to lead to trouble. Lead may be attacked chemically by concrete and when the cable is laid directly into the ground stray currents from distant power circuits and acid and alkaline conditions in the soil readily attack the lead or other metallic sheaths. Fibre ducts are ineffective as electrical insulation and do not generally prevent moisture in the soil from reaching the lead sheath and acting thereupon.

The expense of supplying ducts, conduits or armor for underground cables is an important consideration in the construction of telephone plant which also makes it highly desirable to substitute a cheap and effective protective covering for such cables. The compositions herein described are designed to make it possible to use a thinner lead sheath, to afford sufficient protection in case the metallic armoring tape is omitted, and to assist in making the cable structure water-tight in case of minor holes in the lead or other metallic sheath.

It is proposed to overcome these difficulties by providing novel extrudable plastic compositions for covering the lead sheaths of cables. These compositions are somewhat abrasive resistant as well as heat resistant, moisture-proof, and flexible for all conditions of temperature to which a cable is subjected, besides being inert to acid and alkali conditions in the soil and an excellent electrical insulator. Essentially, these materials are composed of vegetable pitch, blown asphalt, reclaimed rubber, ground silica, asbestos fibres or gilsonite, and mineral fillers, such as ground silica. These ingredients each have been selected for certain properties which they possess and which when mixed together at a high temperature to form a plastic compound which may be extruded under pressure over the sheath of a cable in a manner well known in the art. It will usually be desirable to apply an adhesive compound either before the extrusion process or simultaneously with the process to make the compound stick to the sheath. It is understood, of course, that if the plastic material is sufficiently adhesive in itself that no adhesive compound will be used. Over or under the compound, wrappings, servings, tape, armor or other material may be used for additional protection; under certain conditions a cable may consist of the compound over a lead sheath with an adhesive between; under other circumstances a single or multiple layer of jute impregnated with a preservative may be applied as the outer layer.

The ingredients forming this compound are cheap and readily obtainable. Consequently, the cost of this composition jacket is less than the cost of armor, fibre ducts or conduits for underground cables. Thus, for example, its use may be justified from a commercial viewpoint if the application of a layer of it permits the use of a lead sheath of only slightly decreased thickness without other changes.

Summarizing therefore, the composition must be inexpensive, extrudable, flexible, and capable of being handled and stored at temperatures from zero degrees centrigrade to 35° or 45° C., moisture-proof, resistant to acids and alkalis found in soils, a good electrical insulator, tough over a wide range of temperatures, and free of impurities likely to cause the corrosion of lead or other sheath metals.

The composition does not include added hygroscopic materials or cellulose fibres since these would tend to promote the absorption of water and cause decay.

Typical compositions having the characteristic properties outlined above are as follows:

| Compound | A | B | C |
|---|---|---|---|
| Vegetable pitch | | 10% | 40% |
| Blown asphalt | 15% | 15% | 10% |
| Reclaimed rubber | 45% | 45% | 30% |
| Ground silica | 10% | 10% | 10% |
| Gilsonite | 30% | 20% | |
| Asbestos fibres | | | 10% |

Vegetable pitch is a fatty acid pitch obtained as a by-product in the production of candle and soap stocks, the refining of vegetable oils by means of alkali, the refining of refuse greases, and by the treatment of wool grease. Vegetable and mineral fats and oils are combinations of fatty acids and glycerine known as tri-glycerides. When the tri-glycerides are hydrolized and steam distilled, the glycerine is distilled off and pitch is the residue. This substance is known under other names.

Blown asphalt is a semi-solid or solid product produced by blowing air through liquid native and/or petroleum bitumens which are heated during the blowing process.

Reclaimed rubber is a well known article of commerce needing no definition, as are also ground silica and asbestos fibres.

Gilsonite belongs to that class of materials which are known as asphaltites which are characterized by their high fusing points. It may otherwise be defined as a species of bitumen including dark colored, comparatively hard and non-volatile solids, composed principally of saturated hydrocarbon substantially free from oxygenated bodies and crystallizable paraffines sometimes associated with mineral matter, the non-mineral constituents being difficultly fusible and largely soluble in carbon disulphide.

These constituents are thoroughly milled together in a heated condition in order to prepare the composition for use.

The attached drawing discloses a cable protected by a composition in accordance with the invention.

In the drawing a group of paper insulated conductors 1 are covered by a lead sheath 2 which may be reduced below the usual thickness. Closely adherent to the sheath 2 is a layer 3 consisting of a composition such as hereinbefore described. The layer 3 may be caused to adhere by means of bituminous or resinous compounds such as Chatterton's compound or partially depolymerized rubber. Over the layer 3 is spiralled a layer 4 of tough impregnated paper, two spirals of steel tape 5 and one or more layers of jute 6. The paper and steel tape are each preferably coated with bitumen or its equivalent after application.

For certain purposes either or all of the paper, steel tapes and jute may be omitted.

What is claimed is:

An underground cable comprising a core having at least one insulated conductor, a metallic sheath thereover, and a covering over said metallic sheath, said covering consisting of a close, dense, abrasive-resistant, flexible, moisture-proof, chemically inert jacket of non-hygroscopic, thermoplastic, extrudable material consisting of an intimately intermingled mixture including 10% to 40% vegetable pitch, 10% to 15% blown asphalt, 30% to 45% ground vulcanized rubber, about 10% of ground silica and 10% to 30% of material selected from the group, gilsonite and asbestos fibres, said material being substantially free from hygroscopic materials and cellulose fibres.

ARCHIE R. KEMP.
JOHN H. INGMANSON.